(12) United States Patent
Schumacher et al.

(10) Patent No.: US 9,156,430 B2
(45) Date of Patent: Oct. 13, 2015

(54) METHOD AND SYSTEM FOR ACTIVATING AT LEAST ONE TRIGGERING ELEMENT FOR A PASSENGER PROTECTION MEANS

(71) Applicants: Hartmut Schumacher, Freiberg (DE); Alain Jousse, Stuttgart (DE); Steffen Walker, Reutlingen (DE)

(72) Inventors: Hartmut Schumacher, Freiberg (DE); Alain Jousse, Stuttgart (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/360,440

(22) PCT Filed: Nov. 21, 2012

(86) PCT No.: PCT/EP2012/073169
§ 371 (c)(1),
(2) Date: May 23, 2014

(87) PCT Pub. No.: WO2013/076113
PCT Pub. Date: May 30, 2013

(65) Prior Publication Data
US 2015/0014972 A1    Jan. 15, 2015

(30) Foreign Application Priority Data

Nov. 25, 2011  (DE) .......................... 10 2011 087 077

(51) Int. Cl.
*B60R 21/01* (2006.01)
*B60R 21/26* (2011.01)
*B60R 21/017* (2006.01)

(52) U.S. Cl.
CPC ............... *B60R 21/26* (2013.01); *B60R 21/017* (2013.01)

(58) Field of Classification Search
CPC ...................................................... B60R 21/017
USPC ........ 307/10.1, 9.1; 180/268, 271; 280/728.1, 280/734; 701/45
See application file for complete search history.

(56) References Cited

U.S. PATENT DOCUMENTS

| 5,701,038 | A | * | 12/1997 | Kincaid | ........................ | 307/10.1 |
| 6,114,777 | A | * | 9/2000 | Hermann | ...................... | 307/10.1 |
| 6,456,915 | B1 | * | 9/2002 | Fendt et al. | ..................... | 701/45 |

(Continued)

FOREIGN PATENT DOCUMENTS

| DE | 101 25 812 | 12/2002 |
| DE | 10 2009 027918 | 1/2011 |

(Continued)

OTHER PUBLICATIONS

International Search Report for PCT/EP2012/073169, dated Feb. 21, 2013.

*Primary Examiner* — Adam Tissot
(74) *Attorney, Agent, or Firm* — Kenyon & Kenyon LLP (57) ABSTRACT

A system for activating a triggering element for a passenger protection unit includes: a high-side control circuit establishing a first connection from an energy source to the triggering element, a low-side control circuit establishing a second connection of the triggering element to ground, and a regulating device regulating a firing current for the triggering element). A firing mode is selected as a function of a connected triggering element. In a first firing mode, a first firing current having a first time characteristic is generated for an ohmic triggering element, and in a second firing mode, a second firing current having a second time characteristic is generated for an inductive triggering element.

16 Claims, 4 Drawing Sheets

(56) References Cited

U.S. PATENT DOCUMENTS

2001/0022471 A1* 9/2001 Cook et al. .................. 307/10.1
2012/0181877 A1* 7/2012 Jousse ......................... 307/113

FOREIGN PATENT DOCUMENTS

| JP | 2007284040 A | 11/2007 |
|---|---|---|
| JP | 2014004996 A | 1/2014 |

* cited by examiner

METHOD AND SYSTEM FOR ACTIVATING AT LEAST ONE TRIGGERING ELEMENT FOR A PASSENGER PROTECTION MEANS

BACKGROUND OF THE INVENTION

1. Field of the Invention

The present invention is directed to a method and a device for activating at least one triggering element for a passenger protection means.

2. Description of the Related Art

Passenger protection systems known from the related art do not have a firing mode for activation circuits having low-energy actuators (LEA). These magnetic actuators are used, for example, for triggering of roll bars, in head protection systems for convertibles and/or for triggering of devices for raising engine hoods in pedestrian protection systems.

Use of known firing modes for pyrotechnic airbag actuators according to the valid safety requirements using firing currents of 1.2 A and a pulse duration of 2 ms or 1.75 A and having a pulse duration of 0.5 ms does not meet the safety requirements for low-energy actuators (LEA), which require a current in the range of 1.5 A to 2.2 A having a pulse duration in the range of 1.0 ms to 1.5 ms. Furthermore, a total activation time period of 3 ms is necessary to also enable the gradual current rise of the inductive low-energy actuators (LEA) even at a low energy reserve voltage or battery voltage. Approaches known in the past have used discrete high-side output stages, for example, for triggering such circuits having low-energy actuators (LEA). Alternatively, special approaches having reduced requirements due to known pyrotechnic firing modes are satisfied by integrated high-side output stages. At a current of 1.5 to 2.2 A, simple implementation of the longer activation time period (3 ms) significantly increases the size of an integrated high-side output stage designed for a known pyrotechnic firing circuit.

Published German Patent Application document DE 10 2009 027 918 A1, for example, describes a system and a method for activating at least one triggering element for a passenger protection means. The system described there includes a high-side circuit, which establishes a first connection from an energy source to the at least one triggering element and a low-side circuit, which establishes a second connection from the at least one triggering element to ground. In addition, a regulation which regulates a tripping current for the at least one triggering element is provided, this regulation being associated with the high-side circuit and/or the low-side circuit. Furthermore, the high-side circuit and the low-side circuit each have two output stages, which are connected in parallel for regulation of the tripping current, per triggering element, at least one of the at least two output stages having a current regulation and one or multiple transistors connected in parallel. Scaling is possible by the parallelization of the output stages, i.e., higher and longer tripping current pulses are implemented with two or multiple output stages connected in parallel. The tripping current pulses result in firing of a firing device or in magnetic actuation of a passenger protection means.

BRIEF SUMMARY OF THE INVENTION

The method and device according to the present invention for activating at least one triggering element for a passenger protection means have the advantage over the related art that an additional firing mode for electromagnetic firing circuits, which have essentially inductive triggering elements, so-called low-energy actuators (LEA), is provided in an integrated high-side control circuit for pyrotechnic firing circuits having essentially ohmic triggering elements, without increasing the size of the required circuit surface area of the integrated high-side output stage.

Specific embodiments of the present invention monitor the properties of the various firing circuit loads of a largely ohmic pyrotechnic firing circuit with respect to a massively inductive firing circuit having low-energy actuators (LEA) in an advantageous manner in such a way that a largely area-neutral integration of the high-side output stage is possible. The layout of an integrated high-side output stage with regard to surface area depends mainly on the power loss and energy loss experienced by the output stage in the event of a short circuit during a firing operation. The converted energy is introduced into the thermal capacity of the output stage, which is determined by the required silicon surface area and is dissipated via the effect of heat dissipation over time. Because of the high firing rate, the effect of the dissipation is effectual only with a delay. An output stage approximately 1.76 times larger is required to cover the activation of the inductive firing circuit at approximately the same limit energy per unit of integrated surface area than for activation of the ohmic firing circuit. However, this increase in surface area is prevented by specific embodiments of the present invention.

For the inductive firing circuit having a magnetic low-energy actuator (LEA), the activation time period is selected to be longer only because the current in such an inductive circuit, in particular during activation from an automotive battery, requires a long rise time for reaching the minimum activation current. If the inductive firing circuit is short-circuited to ground in the event of a fault during activation on the positive side, then there is no longer any mentionable inductance in the firing circuit since the current no longer flows through the low-energy actuator (LEA). In this case, the energy input into the high-side output stage is greatest since the current immediately assumes a maximum value, which persists over a longer time period. By tying the current monitoring into the output stage design with respect to shutdown, it is possible to achieve a significant reduction in the energy converted in the output stage after establishing a criterion for the duration of the activation current without violating the safety requirements for the inductive firing circuit. If a regular inductance is present in the firing circuit, the current requires a rise time predefined by this inductance and the available energy reserve voltage, to reach the target current or to lose it again after the shutdown via a free-wheeling diode in parallel with the magnetic switch. The output stage is therefore conductively controlled initially for a set minimum activation time period in the case of an existing inductive firing circuit. After the end of the minimum activation time period, the high-side output stage is deactivated within a maximum activation time period as soon as the predefined time criterion has been met. If the additional time criterion is not met, the high-side output stage is deactivated at the end of the maximum activation time period. The minimum activation time period here also corresponds to the predefined time criterion. This means that the high-side output stage may be dimensioned to be the same as when used for an ohmic firing pellet due to the more intelligent activation for an inductive firing circuit described here.

Specific embodiments of the present invention provide a method for activating at least one triggering element for a passenger protection means, including a high-side control circuit, which establishes a first connection from an energy source to the at least one triggering element, a low-side control circuit, which establishes a second connection from the at least one triggering element to ground, and a regulating device for regulating a firing current for the at least one triggering element. According to the present invention, multiple firing modes are provided, of which one firing mode is selected as a function of a connected triggering element. In a first firing mode, a first firing current having a first time characteristic is generated for an essentially ohmic triggering element, and in a second firing mode, a second firing current having a second time characteristic is generated for an essentially inductive triggering element, a current monitoring function being implemented, which generates at least one control signal, which limits the firing current output as a function of the instantaneous firing mode.

Furthermore, a system for activating at least one triggering element for a passenger protection means is provided, which includes a high-side control circuit, which establishes a first connection from an energy source to the at least one triggering element, a low-side control circuit, which establishes a second connection from the at least one triggering element to ground and a regulating device for regulating a firing current for the at least one triggering element. According to the present invention, multiple firing modes are provided, an evaluation and control unit selecting a firing mode for a connected triggering element in response to a presetting, generating in a first firing mode a first firing current having a first time characteristic for an essentially ohmic triggering element and generating in a second firing mode a second firing current having a second time characteristic for an essentially inductive triggering element, the evaluation and control unit carrying out a current monitoring function and generating at least one control signal, which limits the firing current output in time as a function of the instantaneous firing mode.

It is advantageous in particular that in the first firing mode, a first control signal having a constant first activation time period is generated and applied to the regulating device for regulating the first firing current. The first firing mode may therefore be used for activating ohmic triggering elements which do not cause any significant delays in the rising edges or falling edges of the firing current.

In an advantageous embodiment of the method according to the present invention, a second control signal having a variable activation time period is generated in the second firing mode and is applied to the regulating device for regulating the second firing current. The second control signal is preferably generated in the second firing mode by a logic combination of the at least two additional control signals. A maximum activation time period of the second control signal may be predefined by a third control signal, for example, and a minimum activation time period of the second control signal may be predefined by a fourth control signal, for example. In addition, a fifth control signal may be generated from an output signal of a monitoring device, the second control signal optionally being generated by a combination of the fifth control signal with the third and fourth control signals having an activation time period which is between the minimum activation time period and the maximum activation time period. In the event of a fault, the activation time period may advantageously be reduced to the minimum activation time period by the variable activation time period in order to prevent the energy loss from being too high.

In an advantageous embodiment of the system according to the present invention, the evaluation and control unit may, in the first firing mode, generate a first control signal having a constant first activation time period via the current monitoring function and apply it to the regulating device for regulating the first firing current.

In another advantageous embodiment of the system according to the present invention, the evaluation and control unit may, in the second firing mode, generate a second control signal having a variable activation time period and apply it to the regulating device for regulating the second firing current. The evaluation and control unit may preferably, in the second firing mode, generate the second control signal by a logic combination of the at least two additional control signals; a maximum activation time period of the second control signal may be predefined by a third control signal, and a minimum activation time period of the second control signal may be predefined by a fourth control signal. In addition, the evaluation and control unit may generate a fifth control signal from an output signal of the monitoring device and, by combining the fifth control signal with the third and fourth control signals, may generate the second control signal having a activation time period, which is between the minimum activation time period and the maximum activation time period.

Exemplary embodiments of the present invention are illustrated in the drawings and are explained in greater detail in the following description. The same reference numerals in the drawings denote the components and elements which carry out the same and similar functions.

DETAILED DESCRIPTION OF THE INVENTION

Figure 1:
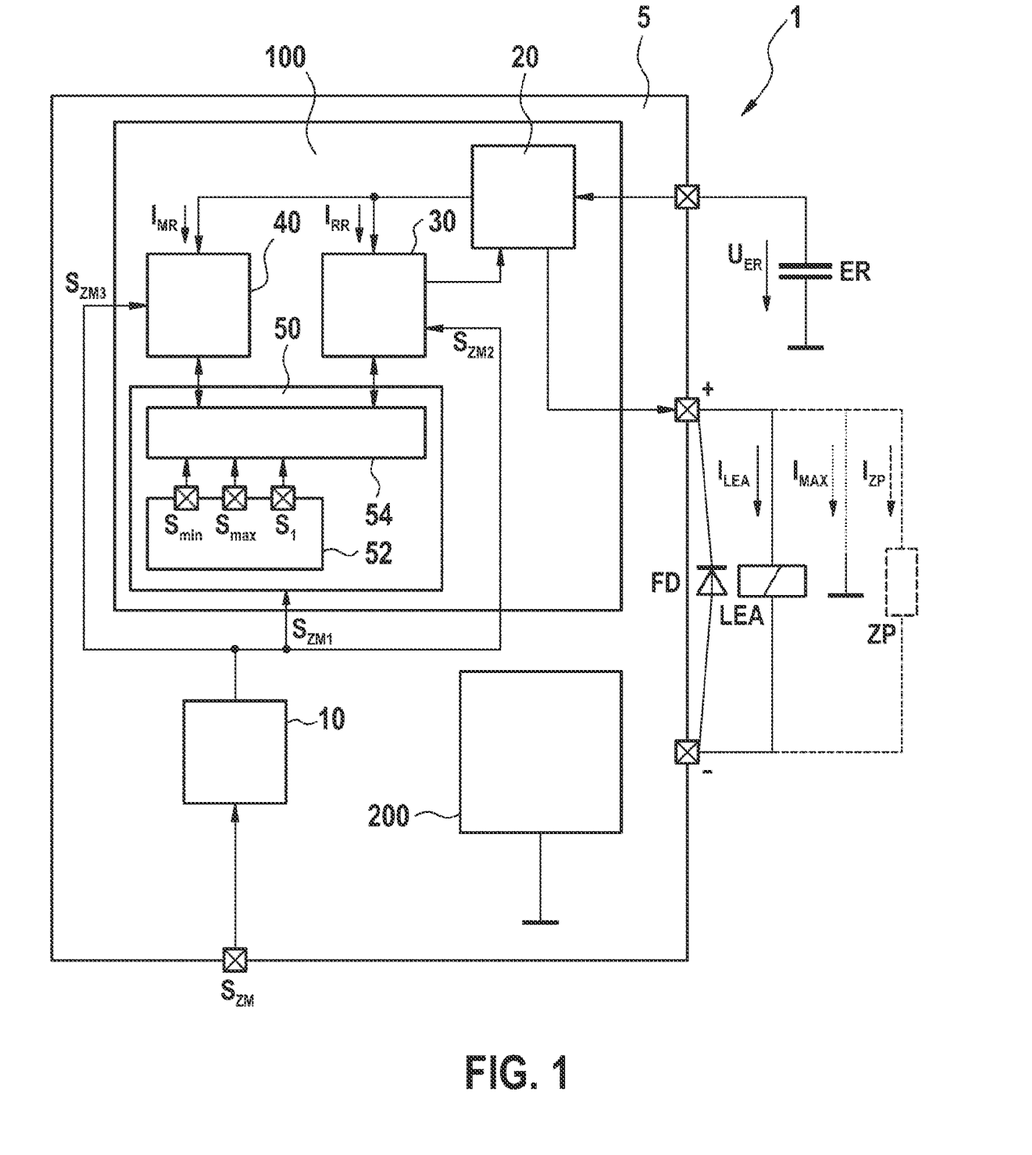
FIG. 1 shows a schematic block diagram of one exemplary embodiment of a system according to the present invention for activating at least one triggering element.
Figure 2:
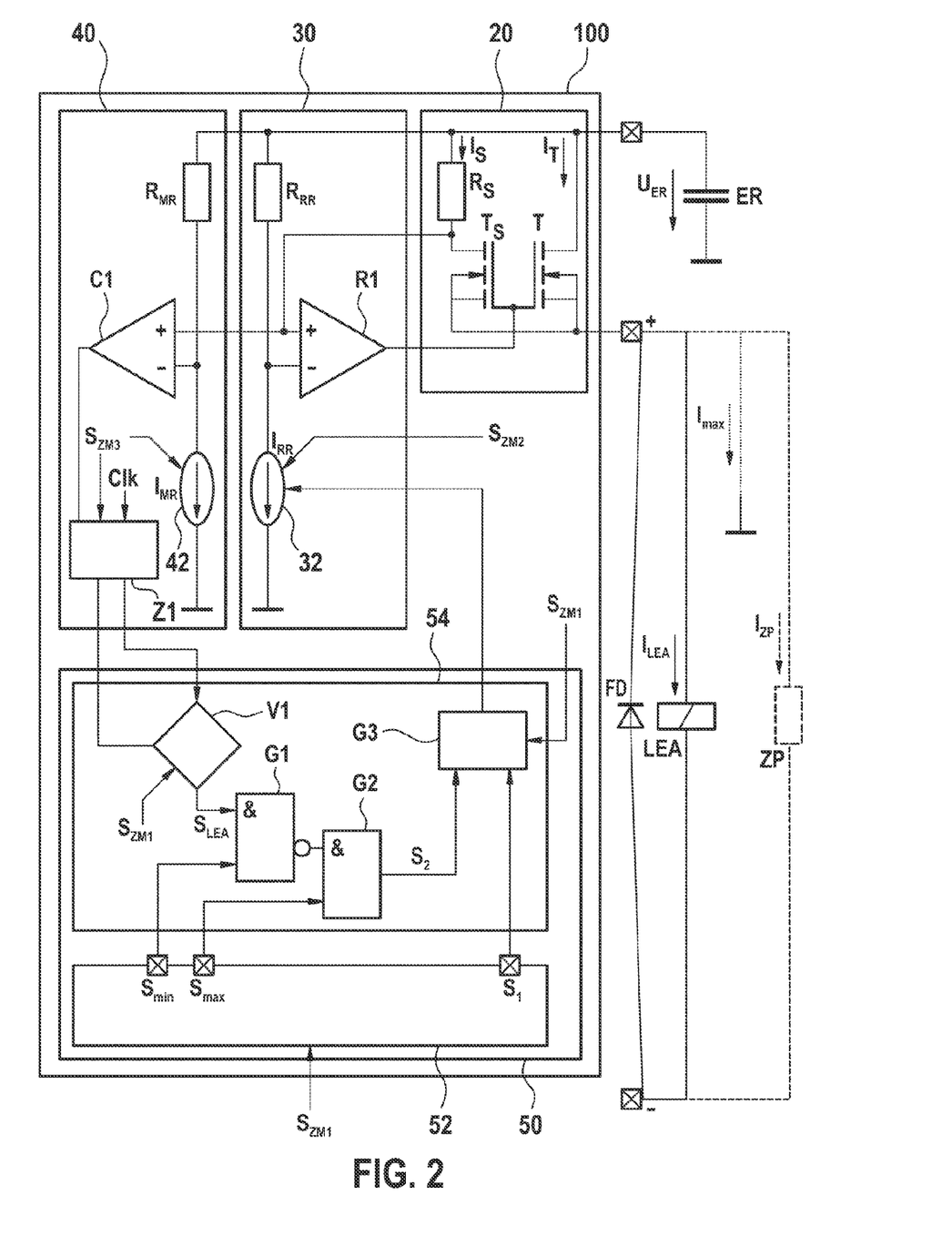
FIG. 2 shows a schematic block diagram of one exemplary embodiment of a high-side control circuit for the system according to the present invention for activating at least one triggering element from FIG. 1.

As is apparent from FIGS. 1 and 2, the exemplary embodiment shown here includes a system 1 for activating at least one triggering element LEA, ZP for a passenger protection means and includes an activation circuit 5 having a high-side control circuit 100, which establishes a first connection from an energy source ER to the at least one triggering element LEA, ZP, and a low-side control circuit 200, which establishes a second connection from the at least one triggering element LEA, ZP to ground. In the exemplary embodiment shown here, an inductive triggering element LEA is connected to corresponding output contacts (+), (−) of activation circuit 5. Furthermore, a free-wheeling diode FD is connected in parallel to inductive triggering element LEA. Alternatively, an ohmic triggering element ZP, which is shown with dotted lines and is designed as a firing pellet, for example, may be connected to the two output contacts (+), (−) of activation circuit 5. High-side control circuit 100 includes a high-side output stage 20, a regulating device 30 for regulating a firing current $I_{LEA}$, $I_{ZP}$ for the at least one triggering element LEA, ZP and a monitoring device 40 for monitoring firing current $I_{LEA}$, $I_{ZP}$ for the at least one triggering element LEA, ZP.

According to the present invention, multiple firing modes are provided, an evaluation and control unit 50 selecting a firing mode for a connected triggering element LEA, ZP in response to a presetting, and in a first firing mode, generating a first firing current $I_{ZP}$ having a first time characteristic for essentially ohmic triggering element ZP, and in a second firing mode, generating a second firing current $I_{LEA}$ having a second time characteristic for essentially inductive triggering element LEA. Evaluation and control unit 50 here carries out a current monitoring function and generates at least one control signal $S_1$, $S_2$, which limits output firing current $I_{ZP}$, $I_{LEA}$ in time as a function of the instantaneous firing mode.

As is also apparent from FIGS. 1 and 2, high-side output stage 20 in the exemplary embodiment shown here has two MOSFET power switches T and $T_S$, which are configured as a current balancing circuit. A sense resistor $R_S$ is situated in the branch of a sense transistor $T_S$ for the current measurement, a sense current $I_S$ flowing through this sense resistor as a defined part of firing current $I_{ZP}$, $I_{LEA}$, so that a voltage corresponding to firing current $I_{ZP}$, $I_{LEA}$ drops across sense resistor $R_S$. This voltage may be evaluated via at least one comparator R1, C1, for example, which is designed as an operational amplifier. Sense current $I_S$ flowing through sense transistor $T_S$ and a current $I_T$ flowing through transistor T are added at the output of high-side output stage 20 to firing current $I_{ZP}$, $I_{LEA}$, which is conducted through triggering element LEA, ZP to low-side control circuit 200.

In the exemplary embodiment shown here, the voltage dropping across sense resistor $R_S$ is evaluated by a first comparator R1 which, as a regulator, is part of regulating device 30 and compares the voltage which represents firing current $I_{ZP}$, $I_{LEA}$ with a voltage which drops across a regulating resistor $R_{RR}$ and represents a regulating reference current $I_{RR}$. First comparator R1, which is designed as a regulator, generates a corresponding regulating signal for MOSFET power switches T and $T_S$ for regulating firing current $I_{ZP}$, $I_{LEA}$. The volume resistances of two MOSFET power switches T and $T_S$ are adjusted as a function of the regulating signal of regulator R1 to generate the desired firing current $I_{ZP}$, $I_{LEA}$. Furthermore, regulating device 30 has a first adjustable current source 32 for presetting a regulating reference current $I_{RR}$. In addition, in the exemplary embodiment shown here, the voltage dropping across sense resistor $R_S$ is evaluated by a second comparator C1, which is part of monitoring device 40 and compares the voltage representing firing current $I_{ZP}$, $I_{LEA}$ with a voltage which drops across a monitoring resistor $R_{MR}$ and represents a monitoring regulating reference current $I_{MR}$. Second comparator C1 generates a starting signal for a counter Z1 when the voltage representing firing current $I_{ZP}$, $I_{LEA}$ is equal to or greater than the voltage representing the monitoring reference current $I_{MR}$. Furthermore, second comparator C1 generates a stop signal for counter Z1 when the voltage representing firing current $I_{ZP}$, $I_{LEA}$ is less than the voltage representing the monitoring reference current $I_{MR}$. Counter Z1 operates using a predefined clock signal Clk having a frequency of 40 kHz, for example. Furthermore, monitoring device 40 has a second adjustable current source 42 for presetting a monitoring reference current $I_{MR}$. Second adjustable current source 42 and counter Z1 are used to check on whether predefined time criteria are met. Thus, for example, it is possible to check on whether a firing current $I_{ZP}$, $I_{LEA}$ having a predefined amperage has been output for a predefined time period.

As is also apparent from FIGS. 1 and 2, evaluation and control unit 50 includes a signal generator 52 for generating control signals $S_1$, $S_{min}$, $S_{max}$ and a control logic 54 having a comparator V1 and multiple gates G1, G2, G3 for generating a control signal $S_2$ and for output of a control signal for first adjustable current source 32. Evaluation and control unit 50 here outputs a first control signal $S_1$ as the control signal for adjustable current source 32 as a function of a firing mode control signal $S_{ZM}$ when the essentially ohmic triggering element ZP is connected. Thus, for example, a first logic state of firing mode control signal $S_{ZM}$ may represent the first firing mode in which a first control signal $S_1$ is output as the control signal for adjustable current source 32, and a second logic state of firing mode control signal $S_{ZM}$ may represent the second firing mode, for example, in which second control signal $S_2$ is output as the control signal for adjustable current source 32. Furthermore, a selection logic 10 is provided, which generates additional firing mode control signals $S_{ZM1}$, $S_{ZM2}$, $S_{ZM3}$ as a function of firing mode control signal $S_{ZM}$ to select a first or second control signal $S_1$, $S_2$ via a multiplexer G3, to adjust a required amplitude for first adjustable current source 32 for presetting of regulating reference current $I_{RR}$ and for second adjustable current source 42 for presetting of monitoring reference current $I_{MR}$ and also to activate signal generator 52 to generate control signals $S_1$, $S_{min}$, $S_{max}$, to activate comparator V1 to output a control signal $S_{LEA}$ and to activate counter Z1 as a function of the selected firing mode accordingly.

Evaluation and control unit 50 generates first control signal $S_1$ at a constant first activation time period $t_1$ and applies it to regulating device 30 for regulating first firing current $I_{ZP}$. If essentially inductive triggering element LEA is connected, then evaluation and control unit 50 outputs, as a function of firing mode control signal $S_{ZM}$, a second control signal $S_2$ as the control signal for adjustable current source 32. Evaluation and control unit 50 generates second control signal $S_2$ having a variable activation time period $t_2$ and applies it to regulating device 30 for regulating second firing current $I_{LEA}$. As is additionally apparent from FIG. 2, evaluation and control unit 50 generates a second control signal $S_2$ in the second firing mode through a logic combination of at least two additional control signals $S_{min}$, $S_{max}$, $S_{LEA}$. A maximum activation time period $t_{max}$ of second control signal $S_2$ is predefined here by a third control signal $S_{max}$, and a minimum activation time period $t_{min}$ of second control signal $S_2$ is predefined by a fourth control signal $S_{min}$. Furthermore, evaluation and control unit 50 generates a fifth control signal $S_{LEA}$ from an output signal of monitoring device 40, in particular from an output signal of counter Z1. Fifth control signal $S_{LEA}$ represents the instantaneous content of counter Z1 and is set to a first logic level with the start of counter Z1, for example, and is reset to a second logic level on reaching a predefined time threshold value. By combining fifth control signal $S_{LEA}$ with third and fourth control signals $S_{max}$, $S_{min}$, evaluation and control unit 50 generates second control signal $S_2$ having an activation time period $t_2$, which is between the minimum and maximum activation time periods $t_{min}$, $t_{max}$.

In the first firing mode, because of the usual tolerances, a typical regulating current $I_{RR}$ of approximately 1.55 A is required for an ensured monitoring of a minimum firing current $I_{ZP}$ of 1.2 A according to the valid safety requirements. The precise value depends on the tolerances of specific semiconductor processes. In the exemplary embodiment shown here, the firing current regulating range is between 1.4 and 1.7 A in the first firing mode, and the firing current monitoring range is in the range of 1.2 to 1.4 A.

Furthermore, in the first and second firing modes, counter Z1 and comparator V1 are used in combination with a memory (not shown) to document the course of first and second firing currents $I_{ZP}$, $I_{LEA}$, so that after a crash the sequence of the firing process with the duration and amplitude of an actual firing current $I_{ZP}$, $I_{LEA}$ may be checked.

The two-dimensional layout of an integrated activation circuit 5 depends mainly on the power loss and energy loss which activation circuit 5 experiences in the event of a short circuit during a firing procedure. FIGS. 1 and 2 illustrate the condition which represents activation circuit 5 dimensioned in the surface area using dotted lines and shows a short circuit of the first output contact (+) to ground. A maximum firing current $I_{max(ZP)}$ is obtained in the first firing mode from a specific minimum firing current of 1.4 A multiplied times a tolerance factor, which includes current regulating tolerances and/or current detection tolerances. In the exemplary embodiment illustrated here, the tolerance factor corresponds to a value of approximately 1.42.

A maximum power loss $P_{max(ZP)}$ of activation circuit 5 is obtained in the first firing mode from maximum firing current $I_{max(ZP)}$ multiplied times a maximum firing voltage $U_{max}$. Maximum energy loss $E_{max(ZP)}$ of activation circuit 5 is obtained from maximum power loss $P_{max(ZP)}$ multiplied times maximum activation time $t_{max}$. For a maximum firing voltage $U_{max}$ of 20 V, for example, a maximum power loss $P_{max(ZP)}$ in the first firing mode is obtained according to equation (1), and a maximum energy loss $E_{max(ZP)}$ is obtained according to equation (2):

$$P_{max(ZP)} = I_{max(ZP)} \times U_{max} = 1.72\text{A} \times 20\text{V} = 34.4\text{W} \tag{1}$$

$$E_{max(ZP)} = P_{max(ZP)} \times t_{max} = 34.4\text{W} \times 2\text{ms} = 68.8\text{mWs} \tag{2}$$

The converted energy is introduced into the thermal capacity of activation circuit 5, which is determined by the required surface area of silicon and dissipated via the effect of heat dissipation over time. Because of the high firing rate, the effect of the dissipation is effectual only with a delay.

According to the effective heat model, it holds according to equations (3) and (4):

$$\text{Effective output stage energy} = I \times U \times dt \times [e^{-(t-dt)/T} + e^{-(t-2dt)/T} + \ldots] \tag{3}$$

$$I \times U \times dt \times \Sigma(e^{-(t-ndt)/T}), t \geq ndt \tag{4}$$

where n=1 to Ta=n×dt, Ta=activation time period and T=time constant of the heat dissipation (assumption=5 ms); this yields on the average a heat dissipation $E\_WL_{(ZP)}$ according to equation (5) for the first firing mode.

$$E\_WL_{(ZP)} = (E_{max(ZP)}/2) \times (1-e^{-Ta/T}) = 34.4\text{mWs} \times (1-e^{-2ms/5ms}) = 11.3\text{mWs} \tag{5}$$

Worst case energy $E_{limit\_design(ZP)}$, which must be borne by activation circuit 5 in the first firing mode, is calculated according to equation (6) as follows:

$$E_{limit\_design(ZP)} = E_{max(ZP)} - E\_WL_{(ZP)} = 68\text{ mWs} - 11.3\text{mWs} = 56.7\text{mWs} \tag{6}$$

For this energy, the surface area of integrated activation circuit 5 is to be or has already been dimensioned according to the related art.

For the second firing mode, a maximum firing current $I_{max(LEA)}$ is obtained for activation circuit 5 from specified minimum firing current $I_{LEA}$ of 1.5 A multiplied times the tolerance factor, which has a value of approximately 1.42, as mentioned above. In the second firing mode, maximum power loss $P_{max(LEA)}$ of activation circuit 5 is obtained from maximum firing current $I_{max(LEA)}$ multiplied times maximum firing voltage $U_{max}$, which is preset as approximately 20 V in the present exemplary embodiment. According to equation (7), a maximum power loss $P_{max(LEA)}$ is thus obtained in the second firing mode, and in the absence of the present invention, a maximum energy loss $E_{max(LEA)}$ is obtained according to equation (8):

$$P_{max(LEA)} = I_{max} \times U_{max} \times 2.18\text{A} \times 20\text{ V} = 42.8\text{W} \tag{7}$$

$$E_{max(LEA)} = P_{max} \times t_{max} = 42.6\text{W} \times 3\text{ms} = 127.8\text{ mWs} \tag{8}$$

For the second firing mode, this yields on the average a heat dissipation $E\_WL_{(LEA)}$ according to equation (9):

$$E\_WL_{(LEA)} = (E_{max}/2) \times (1-e^{-Ta/T}) = 83.8\text{mWs} \times (1-e^{-3ma/5ma}) = 28.8\text{mWs} \tag{9}$$

The worst case energy $E_{limit\_design(LEA)}$, which must be borne by activation circuit 5 in the second firing mode in the absence of the present invention, is calculated according to equation (10):

$$E_{limit\_design(LEA)} = E_{max(LEA)} - E\_WL_{(LEA)} = 127.8\text{mWs} - 28.8\text{mWs} = 100\text{mWs} \tag{10}$$

At approximately the same limit energy per integrated unit of surface area, a larger activation circuit 5 by a factor of 1.76 is necessary to cover the second firing mode in the absence of the present invention ($E_{limit\_design(LEA)}/E_{limit\_design(ZP)} = 1.76$).

This increase in surface area is preventable through specific embodiments of the present invention. The difference in this regard between first triggering element ZP, designed as an ohmic firing pellet, and second triggering element LEA, designed as a magnetic low-energy actuator, is considered for this purpose.

The functioning of activation circuit 5 is described below with reference to FIGS. 3 through 6.

Figure 3:
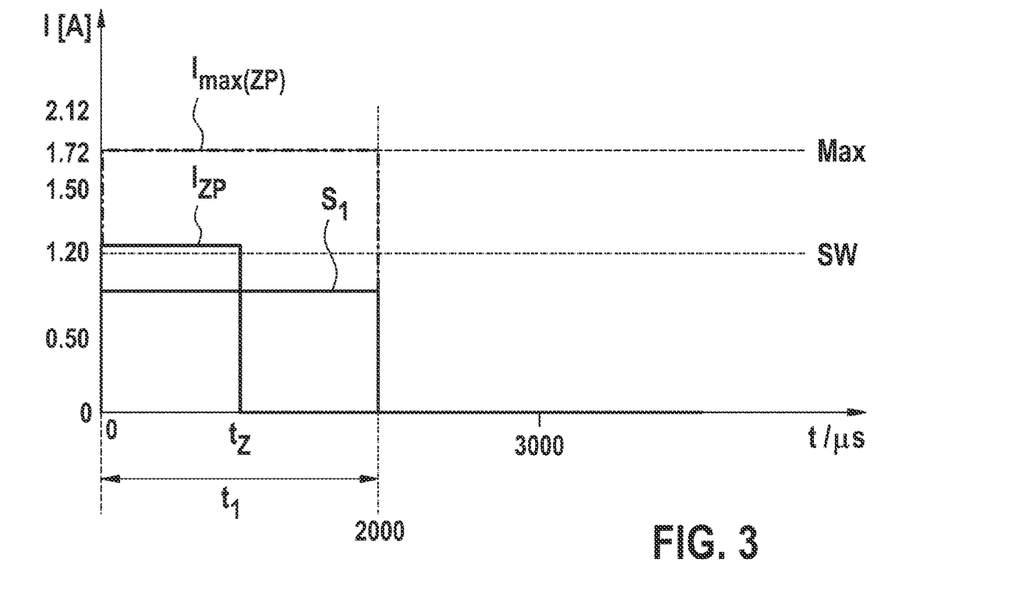
FIG. 3 shows a schematic characteristic diagram of control signals in the high-side control circuit from FIG. 2 and a corresponding first firing current in a first firing mode.

As is additionally apparent from FIG. 3, a first firing current $I_{ZP}$, which has a square-wave form having an amplitude of approximately 1.2 A and is output for maximal 2 ms, for example, is necessary for activating first triggering element ZP in the first firing mode. For this purpose, first control signal $S_1$ is output to first triggering element ZP for a first activation time period $t_1$ of 2 ms. In the worst case fault, i.e., in the event of a short circuit of the first output contact (+) to ground, maximum firing current $I_{max(ZP)}$ is output to ground in the first firing mode for first activation time period $t_1$ via the first output contact (+). As already explained above, present activation circuit 5 is designed accordingly for this fault. In the second firing mode, maximum activation time $t_2$ of 3 ms is selected for second triggering element LEA, which is designed as a magnetic low-energy actuator only for this length of time because the current in an inductive circuit requires a long rise time $t_{an}$ to reach minimum current $I_{LEA}$ of 1.5 A, in particular during activation from an automotive battery having voltages of less than 12 V. In the normal case, first triggering element ZP fires already after a much shorter time period, for example, at the firing point in time $t_z$ depicted here. By firing first triggering element ZP, the connection between the output contacts (+), (−) is separated, so that a first firing current $I_{ZP}$ no longer flows despite first applied control signal $S_1$.

If, in the worst case fault, the first output contact (+) is short-circuited to ground in the second firing mode, then there is no longer any mentionable inductance since the current no longer flows through low-energy actuator LEA. In this case, the energy introduced into activation circuit 5, as in the first firing mode, is the greatest since the current immediately assumes a regulating value between 1.5 A and 2.12 A essentially without any rise time and the voltage across the output stage has the value of the energy reserve voltage of 20 V, for example.

Due to the integration according to the present invention of current monitoring into activation circuit 5 and the corresponding shutdown, after establishing the predefined criterion that second firing current $I_{LEA}$ has exceeded a predefined threshold value of 1.5 A, for example, for a predefined time period of at least 1.5 ms, for example, a definite reduction in the energy converted in activation circuit 5 is achievable, without violating the safety requirements of second firing current $I_{LEA}$ for activation of second triggering element LEA. As is also apparent from FIG. 4, second firing current $I_{LEA}$ in the second firing mode requires a regular inductance LEA situated in the firing circuit, and existing energy reserve voltage $U_{ER}$ requires a predefined rise time period $t_{an}$ to reach the target current between a threshold value of 1.5 A and a maximum value of 2.12 A or it requires a decay time $t_{ab}$ to lose the current after shutdown via the free-wheeling diode. Therefore, in the second firing mode, a defined maximum activation time period $t_{max}$ of 3 ms, for example, is made available for activation circuit 5 via fourth control signal $S_{max}$, which is generated by signal generator 52 having a pulse duration $t_{max}$ of 3 ms and is applied to a first input of an AND gate G2. To make available a minimum activation time period $t_{min}$ of 1.5 ms, for example, signal generator 52 generates a third control signal $S_{min}$ having a pause time period $t_{min}$ of 1.5 ms and applies it to a first input of a NAND gate G1. One output of NAND gate G1 is thus connected to a second input of AND gate G2, so that AND gate G2 outputs second control signal $S_2$ having a high logic level for at least 1.5 ms, regardless of the counter content of counter Z1, and applies this signal as a control signal to first adjustable current source 32. In the exemplary embodiment depicted here, this is accomplished via an OR gate G3, which in the first firing mode applies a first control signal $S_1$ to first adjustable current source 32 and in the second firing mode applies a second control signal $S_2$. After the minimum activation time or minimum activation time period $t_{min}$ of 1.5 ms has elapsed, high-side output stage 20 is deactivated within maximum time window $t_{max}$ of 3 ms as soon as the predefined criterion for second firing current $I_{LEA}$ has been met, which is represented by fifth control signal $S_{LEA}$. As is apparent from FIG. 4, counter Z1 begins the counting operation at point in time $Z_{start}$, and fifth control signal $S_{LEA}$ switches to a low logic level. After a minimum activation time period $t_{min}$ of 1.5 ms has elapsed, third control signal $S_{min}$ switches to a high logic level. However, since fifth control signal $S_{LEA}$ remains at the low logic level until reaching a predefined maximum counter content at point in time $Z_{max}$, the output signal of NAND gate G1 remains at the high logic level until point in time $Z_{max}$, and therefore second control signal $S_2$ at the output of AND gate G2 also remains at the high logic level.

Figure 4:
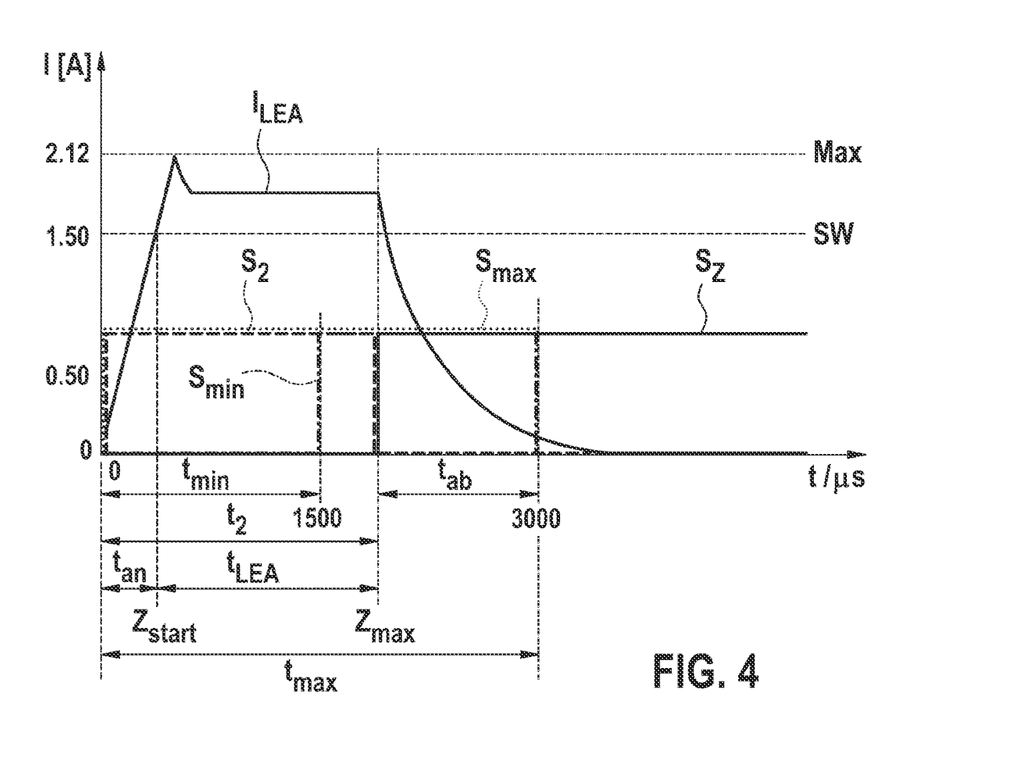
FIG. 4 shows a schematic characteristic diagram of control signals in the high-side control circuit from FIG. 2 and a corresponding second firing current in a second firing mode.
Figure 5:
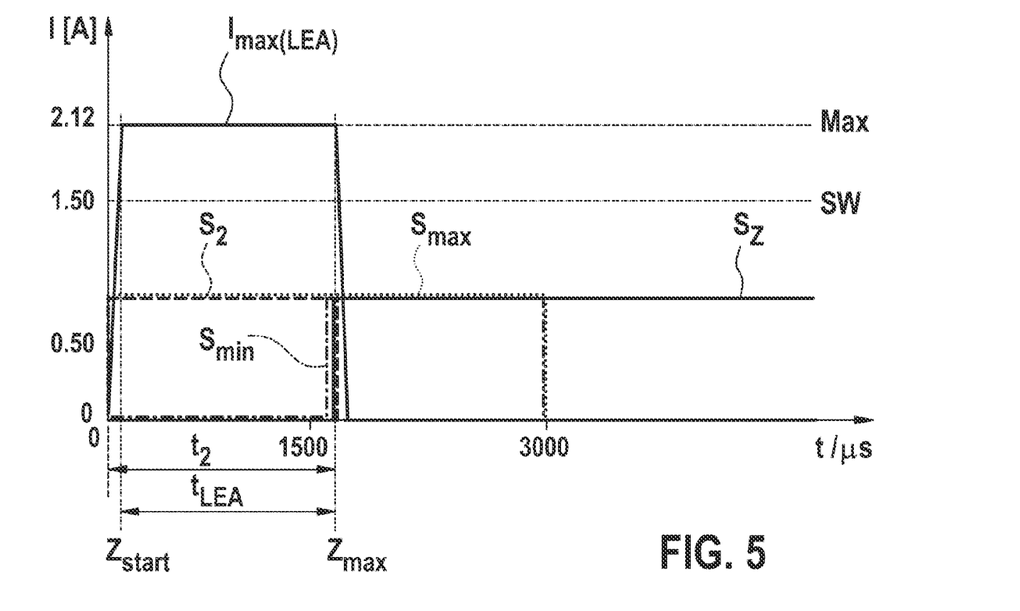
FIG. 5 shows a schematic characteristic diagram of control signals in the high-side control circuit from FIG. 2 and a corresponding firing current curve during a fault in the second firing mode.

According to the exemplary embodiment illustrated here, there is a second triggering element LEA having an inductance of approximately 3 mH in the firing circuit, and energy reserve voltage $U_{ER}$ is maximal 20 V. Minimum required threshold value SW of 1.5 A for second firing current $I_{LEA}$ is thus reached after approximately 300 μs. Counter Z1 then counts how long a second firing current $I_{LEA}$ having a value of at least 1.5 A is flowing. If counter Z1 of monitoring device 40 reaches a time value of 1.5 ms, then second triggering element LEA is supplied with enough current according to the safety requirements, i.e., it is admissible to shut down high-side output stage 20 even before the triggered maximum activation time period $t_{max}$ of 3 ms has elapsed. To increase the availability of high-side output stage 20, the shutdown occurs only when the predefined criterion has been met, i.e., second firing current $I_{LEA}$ has exceeded threshold value SW of 1.5 A for at least 1.5 ms, and at the same time, total activation time $t_2$ of high-side output stage 20 was longer than 1.5 ms. Due to the linkage of NAND gate G1 to AND gate G2, high-side output stage 20 is activated for a sufficiently long period of time to satisfy the predefined criterion, even in the event of a faulty measurement.

If the first output contact (+) is short-circuited to ground in the second firing mode in the worst case fault, then there is no longer any mentionable inductance since the current no longer flows through low-energy actuator LEA. In this case, the energy input into activation circuit 5 is the greatest, as in the first firing mode, since the current immediately assumes the regulating value between 1.5 A and 2.12 A essentially without any rise time, and the voltage across the output stage has the value of the energy reserve voltage of 20 V, for example. As is additionally apparent from FIG. 5, second firing current $I_{LEA}$ reaches minimum required threshold value SW of 1.5 A after a shorter time period since there is no longer any inductance. Counter Z1 then counts how long a second firing current $I_{LEA}$ of at least 1.5 A is flowing. If counter Z1 of monitoring device 40 reaches the time value of 1.5 ms, then second triggering element LEA is thus adequately supplied with current according to the safety requirements, i.e., a shutdown of high-side output stage 20 is allowed even before triggered maximum activation time period $t_{max}$ of 3 ms has elapsed and the maximum energy loss is limited in the worst case fault, i.e., in the event of a short circuit of the first output contact (+) to ground.

Figure 6:
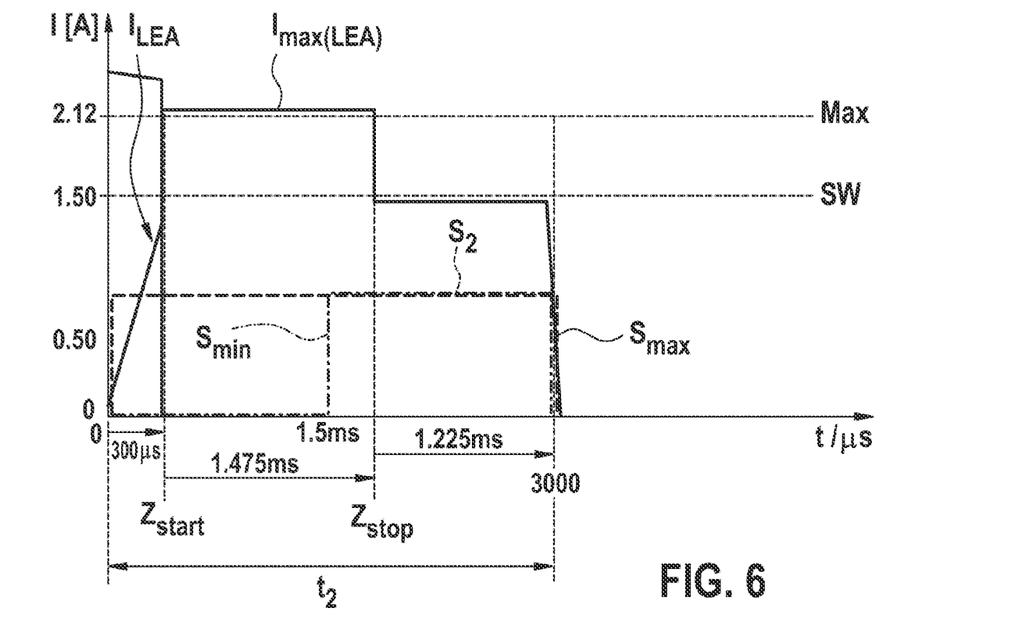
FIG. 6 shows a schematic characteristic diagram of control signals in the high-side control circuit from FIG. 2 and a corresponding firing current curve during a worst case fault in the second firing mode.

FIG. 6 shows a maximum possible load case for activation circuit 5 in the second firing mode. As is additionally apparent from FIG. 6, the maximum load case of activation circuit 5 occurs in the second firing mode when a short circuit is short-circuiting the first output contact (+) to ground immediately before reaching the monitoring current limit of 1.5 A and removes the inductance of second triggering element LEA from the circuit and allows second firing current $I_{LEA}$ to jump from 20 V, for example, to maximum second firing current $I_{max(LEA)}$ of 2.12 A with almost no change in maximum energy reserve voltage $U_{ER}$ of 20 V, for example. This condition then persists for an additional time period, which is shorter than the predefined criterion of 1.5 ms and has a value of 1.475 ms, for example, so that counter Z1 stops the counting operation at point in time $Z_{stop}$ but fifth control signal $S_{LEA}$ remains at the low level, and the shutdown condition has not yet been reached. This may hypothetically be caused by a current reduction from 2.12 A to just below 1.5 A (1.49 A) due to a theoretical increase in resistance in the short-circuiting circuit from previously 0Ω to approximately 12, Ω with a current reduction from 2.12 A to just beneath 1.5 A. High-side output stage 20 therefore also remains activated for the remaining time period until reaching the maximum activation time period $t_{max}$ of 3 ms and delivers current into the short circuit, but no longer at the upper tolerance limit of the regulating current of 2.12 A. Maximum possible energy loss $E_{max(LEA)n}$ for this hypothetical fault according to equation (11) is made up of the sum of the energy loss during the current rise in the second triggering element (300 μS) and the energy loss during the 0Ω short circuit at the first output contact (+) to ground for 1.475 ms and the energy loss during the 12Ω short circuit at the first output contact (+) to ground for 1.225 ms.

$$E_{max(LEA)n}=0.75V\times(1.5\ A/2)\times0.8ms+20V\times2.12A\times1.47ms+1.62V+1.498A\times1.08\times1.225ms=85mWs \quad (11)$$

This corresponds approximately to the maximum energy loss of activation circuit 5 in the first firing mode. Equation (12) holds for the heat dissipation by using the heat model:

$$E\_WL_{(LEA)n}=31.27mWs(1-e^{(-1ms/5ms)})=8.1mJ \quad (12)$$

In the worst case, the load of activation circuit 5 in the second firing mode for second triggering element LEA is obtained from equation (13):

$$E_{limit\_design(LEA)n} = E\max_{(LEA)n} - E_{WL_{(LEA)n}} = 66mWs - 8.1mWs = 57.9mWs \quad (13)$$

This value approximates the load of activation circuit 5 in the first firing mode.

$E_{limit\_design(ZP)} = 57$ mWs
$E_{limit\_design(LEA)n} = 58$ mWs

Specific embodiments of the present invention may advantageously control different firing circuit loads, which have, for example, a largely ohmic pyrotechnic firing circuit having an inductance in the µH range as well as a circuit having low-energy actuators (LEA) having an inductance in the mH range, in such a way that a largely area-neutral integration of the activation circuit is made possible. This means that specific embodiments of the present invention may be used for activation of ohmic triggering elements as well as of inductance triggering elements. This results in an activation circuit, which may operate the firing pellet at the operating point as well as the LEA operating point at the same surface area, including the faults.

The functions of logic gates G1, G2, G3 presented here may of course also be replaced by a strict NAND or NOR logic. Furthermore, the functions and control signals presented here may also be generated by processing a software program through an evaluation and control unit designed as a computing unit.

What is claimed is:

1. A method for controlling at least one triggering element for a passenger protection unit, comprising:
    establishing, by a high-side control circuit, a first connection from an energy source to the at least one triggering element;
    establishing, by a low-side control circuit, a second connection from the at least one triggering element to ground;
    regulating, by a regulating device, a firing current for the at least one triggering element;
    selecting, by an evaluation and control unit, one of a plurality of firing modes as a function of the at least one triggering element, such that a first firing mode that provides a first firing current is selected for an essentially ohmic triggering element, and a second firing mode that provides a second firing current is selected for an essentially inductive triggering element, wherein a time characteristic of the first firing current is different than a time characteristic of the second firing current; and
    performing, by the evaluation and control unit, a current monitoring function which generates at least one control signal that limits the output firing currents in time as a function of the instantaneous firing mode.

2. The method as recited in claim 1, wherein, when the first firing mode is selected, the generated at least one control signal includes a first control signal that has a constant first activation time period and that is applied to the regulating device for regulating the first firing current.

3. The method as recited in claim 2, wherein, when the second firing mode is selected, the generated at least one control signal includes a second control signal that has a variable activation time period and that is applied to the regulating device for regulating the second firing current.

4. The method as recited in claim 3, wherein the second control signal is generated in the second firing mode by a logic combination of at least two additional control signals.

5. The method as recited in claim 4, wherein a maximum activation time period of the second control signal in the second firing mode is defined by a third control signal, and a minimum activation time period of the second control signal is defined by a fourth control signal in the second firing mode.

6. The method as recited in claim 5, wherein a fifth control signal is generated from an output signal of a monitoring device, and wherein the second control signal in the second firing mode is generated by combining the fifth control signal, the fourth control signal, the third control signal, and such that the activation time period of the second control signal is between the minimum and the maximum activation time periods.

7. A system for activating at least one triggering element for a passenger protection unit, comprising:
    a high-side control circuit configured to establish a first connection from an energy source to the at least one triggering element;
    a low-side control circuit configured to establish a second connection from the at least one triggering element to ground;
    a regulating device configured to regulate a firing current for the at least one triggering element; and
    an evaluation and control unit configured to:
        select, in accordance with a presetting, one of a plurality of firing modes for the at least one triggering element, such that a first firing mode that provides a first firing current is selected for an essentially ohmic triggering element, and a second firing mode that provides a second firing current is selected for an essentially inductive triggering element, wherein a time characteristic of the first firing current is different than a time characteristic of the second firing current; and
        perform a current monitoring function for generating at least one control signal that limits the output firing currents in time as a function of the instantaneous firing mode.

8. The system as recited in claim 7, wherein the at least one control signal, in the first firing mode, includes a first control signal having a constant first activation time period and that is applied to the regulating device for regulating the first firing current.

9. The system as recited in claim 8, wherein the at least one control signal, in the second firing mode, includes a second control signal having a variable activation time period and that is applied to the regulating device for regulating the second firing current.

10. The system as recited in claim 9, further comprising a monitoring device, wherein:
    a maximum activation time period of the second control signal is defined by a third control signal;
    a minimum activation time period of the second control signal is defined by a fourth control signal;
    the evaluation and control unit is configured to generate a fifth control signal from an output signal of the monitoring device; and
    the second control signal is generated in the second firing mode by combining the third, fourth and fifth control signals, such that the second control signal has an activation time period which is between the minimum and the maximum activation time periods.

11. A method for controlling at least one triggering element for a passenger protection unit, comprising:
    combining circuitry so that they form (a) a high-side control circuit configured to establish a first connection from an energy source to the at least one triggering element, and (b) a low-side control circuit configured to establish a second connection from the at least one triggering element to ground;

arranging a regulating device so that it is able to regulate a firing current for the at least one triggering element;

providing an evaluation and control unit that is configured to select one of a plurality of firing modes as a function of the at least one triggering element, such that a first firing mode that provides a first firing current is selected for an essentially ohmic triggering element, and a second firing mode that provides a second firing current is selected for an essentially inductive triggering element, wherein a time characteristic of the first firing current is different than a time characteristic of the second firing current; and arranging the evaluation and control unit so that it is able to perform a current monitoring function which generates at least one control signal that limits the output firing currents in time as a function of the instantaneous firing mode.

12. The method as recited in claim 11, wherein, when the first firing mode is selected, the generated at least one control signal includes a first control signal that has a constant first activation time period and that is applied to the regulating device for regulating the first firing current.

13. The method as recited in claim 12, wherein, when the second firing mode is selected, the generated at least one control signal includes a second control signal that has a variable activation time period and that is applied to the regulating device for regulating the second firing current.

14. The method as recited in claim 13, wherein the second control signal is generated in the second firing mode by a logic combination of at least two additional control signals.

15. The method as recited in claim 14, wherein a maximum activation time period of the second control signal in the second firing mode is defined by a third control signal, and a minimum activation time period of the second control signal is defined by a fourth control signal in the second firing mode.

16. The method as recited in claim 15, further comprising providing a monitoring device such that a fifth control signal can be generated from an output signal of the monitoring device, wherein the second control signal in the second firing mode is generated by combining the fifth control signal, the fourth control signal, the third control signal, and such that the activation time period of the second control signal is between the minimum and the maximum activation time periods.

* * * * *